April 24, 1951 M. D. BERGAN 2,550,636
ELECTRIC SPADE TERMINAL RECEPTACLE
Filed Feb. 7, 1950 2 Sheets-Sheet 1

*INVENTOR.*
MARTIN D. BERGAN
BY *James C. Ledbetter*
ATTORNEY.

April 24, 1951          M. D. BERGAN          2,550,636
ELECTRIC SPADE TERMINAL RECEPTACLE
Filed Feb. 7, 1950          2 Sheets-Sheet 2
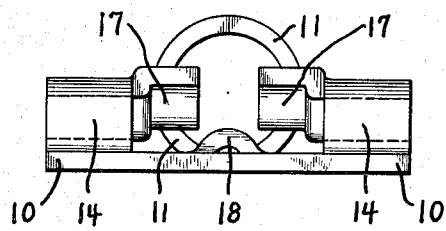
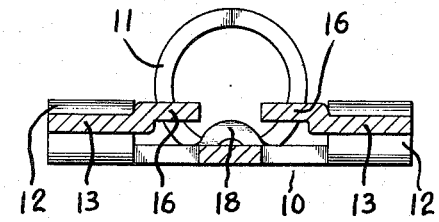
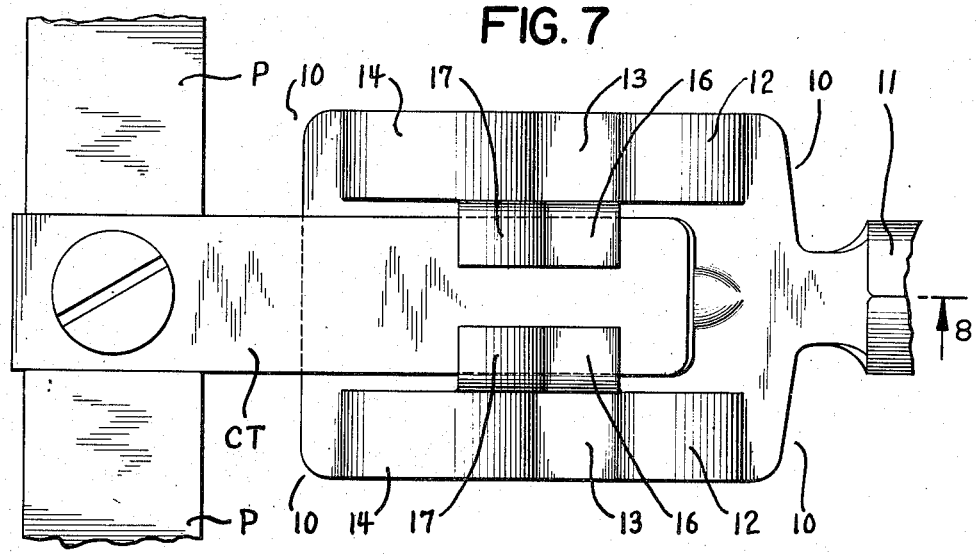
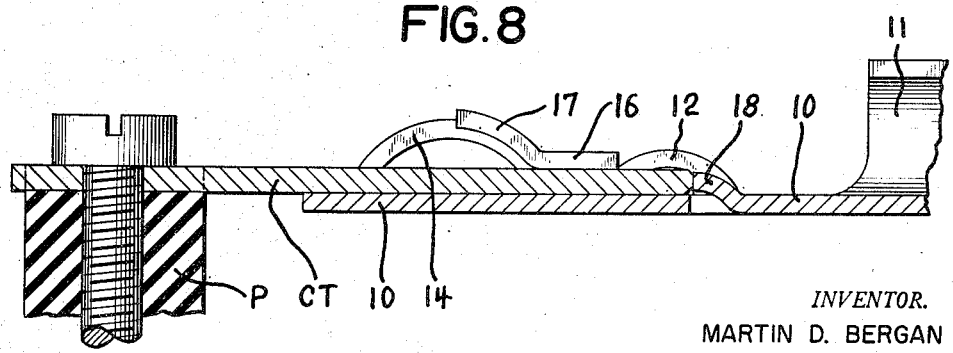
INVENTOR.
MARTIN D. BERGAN
BY
James C. Ledbetter
ATTORNEY Patented Apr. 24, 1951

2,550,636

UNITED STATES PATENT OFFICE 2,550,636

ELECTRIC SPADE TERMINAL RECEPTACLE

Martin D. Bergan, Westfield, N. J., assignor to The Thomas & Betts Co., Elizabeth, N. J., a corporation of New Jersey Application February 7, 1950, Serial No. 142,920

4 Claims. (Cl. 173—363)

This invention relates to connectors and more especially to a new and useful Electric Spade Terminal Receptacle for manually making quick-connect and disconnect contact engagement with conventional terminals on electrical apparatus.

In a variety of electrical wiring installations, there is need for improvement in single conductor (one-wire) terminals of the receptacle type permanently connected on the end of a flexible wire and suited for manual operation in making plug-on quick-disconnect contact engagement with panel board, condenser, battery, and other electrical-apparatus terminals to which current is either fed thereto or received therefrom.

Thus, the invention seeks to provide a novel electrical terminal of the receptacle type which is mobile and convenient, on a length of flexible wire, for hand operation in manipulating such disconnect receptacle (also known as a "clip") onto a conventional contact tongue, the latter ordinarily being immoble because mounted in a fixed relation on electrical apparatus of a stationary character.

Accordingly, an object of the invention is to provide a one-piece quick-disconnect electrical terminal of the receptacle type for single-wire runs, characterized by its simplicity in design and structure, together with an improved pressure contact relation with a conventional contact tongue, the latter being adapted to receive my new receptacle which is readily plugged into current-transmitting position thereon.

The accompanying drawings with description and claims explain the invention as preferred and embodied at this time for an understanding of the problems sought to be solved. Since the teachings herein may suggest structural changes to others who wish to avail themselves of the benefits of the invention, it is pointed out that subsequent modifications hereof may well be the same in spirit and principle as this disclosure.

The drawings are made to large scale from a production specimen of the terminal receptacle, the front or inner end of which is at the left in the views. The rear or outer end of the receptacle is at the right on the drawings and permanently connects with a suitable length of insulated flexible wire in a known way (as shown in Fig. 1) for the purpose of reaching and establishing convenient disconnect contact engagement with electrical apparatus, as diagrammatically shown in Figs. 7 and 8, supplemented by Fig. 4.

Fig. 1 shows a plan view, while

Fig. 5 shows an elevation of the front end, that is, looking from the left in Fig. 2, as indicated by the directional viewing line 5.

Fig. 6 is a transverse section on the line 6 of Fig. 2, showing structural details at the mid-portion of the disconnect receptacle, including a resilient contact lip pair which tensions under resilient pressure against the conventional contact tongue adapted to slidably receive the receptacle pushed thereonto.

Fig. 7 is a plan view and Fig. 8 is a mid-longitudinal section on the line 8 of the disconnect receptacle in its final position embracing the stationary contact tongue in electrical-transmitting relation therewith.

Figure 1:
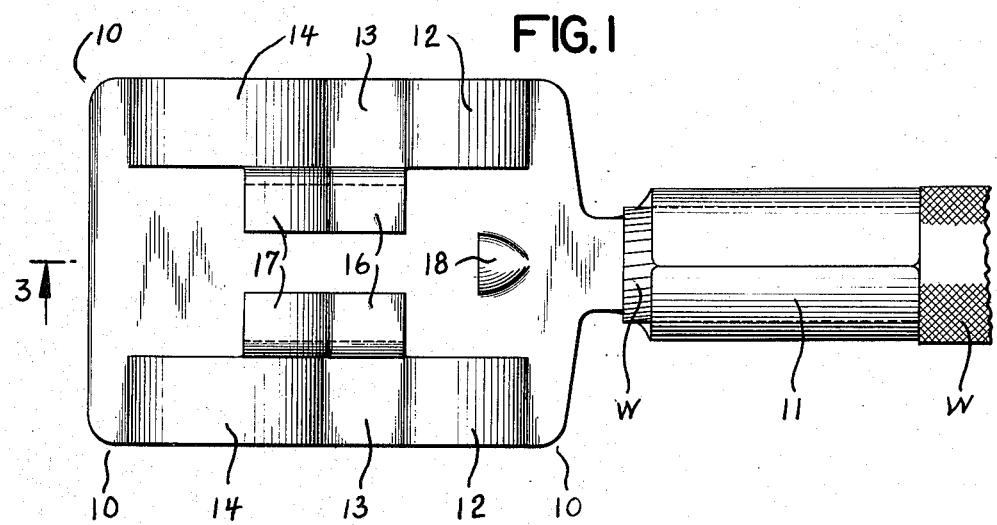
Figure 2:
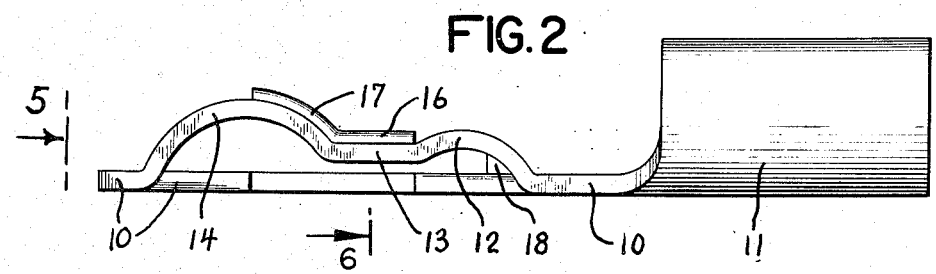
Fig. 2 is a side elevation, of this new quick-disconnect electrical terminal receptacle well suited for making plug-on contact-connection with a stationary contact tongue of conventional form adapted to receive said receptacle disengageably thereupon.
Figure 3:
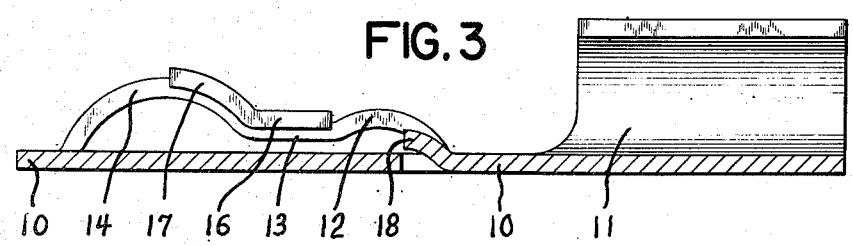
Fig. 3 is a mid-sectional view through the entire length of the terminal receptacle along the section line 3.
Figure 4:
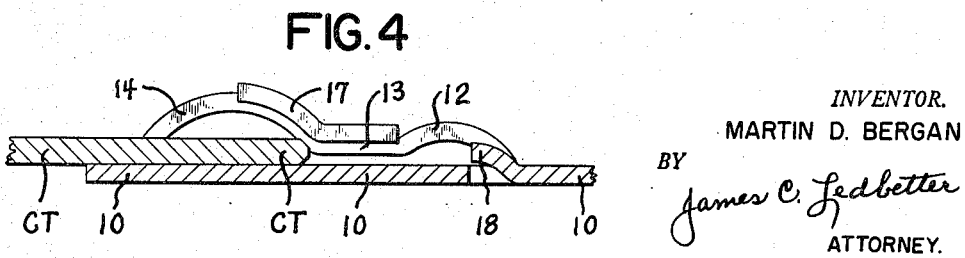
Fig. 4 is a fragmentary view showing the disconnect receptacle in the act of being manually pushed or plugged onto the contact tongue, and having reached initial position, that is, preliminary to its finally connected position shown in Figs. 7 and 8.

Thus, Figs. 4, 7 and 8 are to be considered together in understanding the utility of this novel terminal receptacle, that is, its use with a conventional contact tongue which ordinarily is mounted in a stationary position on or as a part of electrical apparatus requiring quick-disconnect relation with a single-run flexible conductor.

Further reference is made to the drawings for a more detail description of the invention. In this connection, an explanation is first made of one suitable form of conventional disconnect contact tongue frequently found embodied in electrical apparatus, as indicated in a general way in Figs. 4, 7 and 8. Such tongue is in itself a terminal adapted to cooperate with my new receptacle for making quick-connect and disconnect engagement when completing an electrical circuit.

A disconnect contact tongue CT of known form comprises an elongated straight conductive (copper) strip of flat bar stock having parallel side edges, with an outer or front end of imperforate form which is ovalled or chamfered for convenient piloting entry into the terminal receptacle comprising this invention. Such tongue CT is a male terminal and usually has its rear or inner end screw-fastened or otherwise secured to electrical apparatus as represented by a wiring panel P. The conductive screw shown may be taken to indicate a disconnect binding post having an electrical wire connection (not shown) adapted to be attached to it.

Accordingly, the panel P and disconnect contact tongue CT are shown schematically in Figs. 4, 7 and 8, being explanatory of conventional terminals of the male type permanently carried on a wiring panel, condenser, battery, or other apparatus, and with which this new receptacle cooperates. These three views are presented as an illustration of the environment of the invention and in aid of understanding its improved mode of operation.

Incidentally, the straight flat imperforate contact tongue CT is one of the simplest forms known to the art. It lacks tensioning means and thus inherently is inert insofar as making good electrical connection with a mating terminal. It is one of the problems of this invention to produce an effective receptacle useful with the simple type of straight edge disconnect tongue.

Coming now to a description of the inventive concept, and an example of one preferred physical embodiment thereof, there is shown a terminal receptacle in all the views of the drawings. It comprises a flat body 10, preferably of elongated rectangular shape, thus having parallel side edges, with its front end at the left, and its rear end at the right.

The flat body 10 may be made of nominally-hard metallic-bar stock (copper sheet) which is tempered to resist any tendency to bend permanently out of shape when subjected to service. And moreover, the temper imparts resiliency for obtaining flexure by which to spring-load it and thereby induce a reactive (return) tension into the contact portions of the body 10 when the connector is plugged into electrical connecting positon on the stationary disconnect tongue, as in Figs. 4, 7 and 8.

The rear end of the elongated rectangular flat body 10 is provided with any suitable means, such as a conductive sleeve 11, for permanently connecting a flexible conductor (wire W) therewith in a known way. This wire-receiving sleeve 11 is usually integral with the rear end of the flat body 10. One practice is to make a solderless connection by annularly compressing the sleeve as a whole or by segmentally indenting a portion thereof onto the bare copper strands W at the end of a length of insulated flexible wire, thereby homogeneously unifying the sleeve and strands.

The flat one-piece terminal receptacle (its body 10 as a whole) is characterized by die-formed integral portions raised above the plane of the body and duplicated along its two lengthwise parallel side edges. An important feature inheres in a resilient or pressure yielding contact lip means suspended off-side between or bridging from a carrier arch pair which, together with other features, provides a novel receptacle having an overall symmetry between its duplicate or twin die-pressed side edge portions and the flat body 10 as a whole. A description follows of one duplicate side edge portion of the receptacle body but applies to both sides thereof.

Accordingly, a rear arch 12 has its rearward end portion integral with the flat body 10 and rises above its inner plane surface. The front end of this arch 12 reaches forward and is integral with and supports a flat bridge portion 13 parallel to the plane of the flat body. Next, the forward end portion of the bridge 13 joins integrally with the rear end of a front arch 14, and the forward end of the latter curves down to the plane of the body 10 and is integral therewith. The axis of each arch is transverse to the flat body.

It is seen that the two arches 12 and 14 are in tandem, that they span the greater portion of the length from rear to front of the body 10 and along its side edge (both side edges), and that they centrally support the lengthwise bridge 13 within the space between their adjacent end portions and above the inner contact surface of the body. The two longitudinally spaced arches 12 and 14 are aligned and they support the central bridge span 13 therebetween and are in parallel spaced reltion with and above the upper or inner surface of the flat body.

In the present example of the invention, the front arch 14 is formed on a longer radius than the rear arch 12. This radius differential renders the front arch 14 more susceptible to flexure than its companion tandem arch 12 at the rear. In other words, the front segment or arch offers less resistance to flexure than the rear stiffer arch. By reason of this feature, it follows that the front portion of the suspended bridging span 13 more readily yields and flexes upwardly (under sliding entry pressure of the contact tongue CT) than the rear portion of the span because said rear portion is adjacent the more rigid arch 12 which offers greater resistance to outward flexure from the flat body 10. Conversely, the front larger resilient arch 14 spring-loads with less reactive tension than the rear smaller spring arch 12.

While the foregoing description is largely written in the singular for clarity, as to one side edge spring arched portion, it nonetheless applies to both of the die-formed side edges, as will be seen in the drawings. Accordingly, the two arch pairs (one on each side edge of the body 10) are formed in parallel spaced relation, with the flat imperforate contact area of the body disposed therebetween and also below the reach of the duplicate arched construction.

Accordingly, the two rear arches 12 have a common axis and equal length short radii, the same being true of the front arches 14 with equal but longer radii. In effect, this unique suspension of the duplicate form side edges, above the electrical contact surface of the flat body 10, disposes the die-formed portions in tandem with and abreast of each other, as well as setting each raised side edge coplanar with the other.

Next, it is seen that a contact lip 16 is about equal in length to the bridge portion 13 and is integral along the inner edge of the latter. Thus, the contact lip is rectangular, is straight and flat, and is suspended inwardly and off-side toward the longitudinal axis of the flat body 10. Note that the bridge 13 and its inward continuity, to form the in-set contact lip 16, suspends the latter in parallel relation to and spaced from the inner flat contact surface of the body. This parallel spacing is important and is measured slightly less than the thickness of the contact tongue CT, as shown in Fig. 4.

Likewise, there is provided an in-set guide nose 17 forward of and integral with the front portion of the contact lip 16. Not only that, but the guide nose 17 also is carried along the inner edge of the front arch 14 and formed on the same radius. Thus, it is seen that the contact lip 16 comprises an inside extension of the flat bridge 13, and that the same is true of the guide nose 17 which comprises an arcuate inside extension of the arch 14. In other words, the structural portions 16 and 17 are supported inwardly and over the central area of the imperforate flat body 10 by being formed integrally on the inside lengthwise edge of the raised bridging arches 12 and 14 carrying the central span 13.

Here again, the foregoing description of the contact lip 16 and guide nose 17 is in the singular, as to one set thereof, but it is observed that it applies to the duplicate-form arrangement which, taken all together including the arched suspension on each side length of the flat body 10, presents a pattern of overall symmetry in design and construction.

Study of the drawings reveals that the two lengthwise side edge portions 13 and 13, etc., together with the two off-set or inwardly overhanging contact lip and nose pair 16 and 17, are extruded by die-forming these portions outwardly from the plane of the flat body 10, and that the mid-area of the body remains imperforate by which to present surface-area continuity with the contact tongue CT when these two terminals are plugged together.

The greater circumference of the front arch pair 14 positions the arcuate guide nose pair 17 (the front edges of both) high above the plane of the flat body 10. Thus, the front edges of the two guide noses, being spaced from the body, provide a wide-open entry mouth for more readily finding and funneling the free end of the contact tongue CT into registry, when my receptacle connector is being manipulated onto the stationary conventional contact tongue.

According to the foregoing, it will now be seen that the greater radius of the two front arches 14 imparts to them two functional advantages. First, the two front arches (being of larger circumference) possess more resiliency, and thus more easily flex outwardly from the flat body, than is the case of the two rear stiffer arches 12. Second, the high rise of the two front arches 14 so adequately spaces the arcuate guide noses 17 from the body as to make a wide-open front end receptacle for quick-connect piloting entry of the receptacle on to the contact tongue CT.

Finally, a stop boss 18 is extruded upwardly (in the position shown) from the contact surface of the flat body. The free end of the terminal tongue CT comes to rest against this stop when my receptacle is pushed into finally connected position thereon.

Coming to the use and operation of this novel terminal receptacle, it is readily seen that the front open-mouth end thereof may be quickly manipulated to initially embrace the outer end of the disconnect tongue CT by nosing itself thereonto. The thickness of the tongue is slightly greater than the parallel pressure space between the flat plane contact surface of the body 10 and the parallel contact surfaces of the contact lips 16. Accordingly, substantial reactive pressure is developed, by the arched suspension of the side edge portions, in order to make good contact between the tongue CT and the receptacle body 10 as a whole.

Of importance is the fact that the contact tongue CT initially slides easily into position underneath the front portion of the contact lip pair 16 and 16, due to the initial light spring-loading resistance of the front arch pair 14 and 14. Thereafter, the receptacle gradually tightens (contact pressure accumulates) as it moves forward against the increasing resistance interposed by the rear arch pair 12 and 12. This feature improves operation of the receptacle clip 10 with the disconnect tongue CT because of the ease and convenience with which they initially align and start their engaging movement. Suffice it to say that the receptacle 10 just as readily disconnects from the tongue CT by applying a definite pull thereon to separate the two connector parts and interrupt the electrical circuit.

This disclosure explains the principles of the invention and the best mode contemplated in applying such principles, so as to distinguish the invention from others; and there is particularly pointed out and distinctly claimed the part, improvement or combination, which constitutes the invention or discovery, as understood by a comparison thereof with the prior art.

The invention is presented to fill a need for a new and useful Electric Spade Terminal Receptacle. Various modifications in construction, mode of operation, use and method, may and often do occur to others, especially so after acquaintance with an invention. Accordingly, it is to be understood that this disclosure is exemplary of the principles herein and embraces equivalent constructions.

What is claimed is:

1. An electrical terminal receptacle, for quick-connect and disconnect use with a conventional contact tongue adapted to be received thereinto; comprising an elongated rectangular shaped body, having means at its rear end to receive a wire adapted to be permanently connected therewith, and having an inner flat contact surface; a front and rear arch formed in tandem, along each parallel lengthwise side edge of the body, thus four arches, symmetrical with each other on and with the body, said arches being raised above the contact surface of said body, on axes transversely thereof, and spaced apart longitudinally as well as transversely, with the forward ends of the two front arches and the rearward ends of the two rear arches integrally formed with the body at its front and rear ends, thus each pair of arches spanning the body lengthwise, and susceptible to resilient flexure in relation to the contact surface of the body; and a bridge carried between each of the two arches paired in tandem, integral with the latter, thus two bridges supported above the contact surface of the body by said four resilient arches; and contact means carried by each bridge, against which one surface of the aforesaid contact tongue engages, as the terminal receptacle hereof slides onto said tongue, with the other surface of said tongue also slidably engaging the contact surface of the body under frictional pressure, thereby urging the two bridges resiliently outward from the contact surface of the body, and spring-loading the arches, which react under tension to exert pressure on the contact tongue.

2. An electrical terminal receptacle as covered in claim 1, but having additional features; comprising a contact lip, integrally formed on the inner lengthwise edge of each bridge, and having a contact surface facing and paralleling the contact surface of the body, thus being suspended inwardly toward mid-position of said body, thus off-side inward from the tandem arch pair, hence two said contact lips symmetrical with each other and the body; and an arcuate guide nose integrally formed on the front edge of each contact lip, likewise integral along the inner edge of each front arch, the front portion of said guide nose being spaced from the contact surface of the body, hence two said guide noses symmetrical with each other and the body, and thereby forming a wide-open front end on the terminal receptacle for aiding in manipulating it into plug-on alignment with the contact tongue.

3. An electrical terminal receptacle, as covered in claim 1, but further characterized, in that the front arches are formed on a radius longer than the rear arches, and thus spring-load with less reactive tension than the rear arches, by which the front end of the receptacle initially slides with minimum friction onto the contact tongue, but cumulatively increases in frictional pressure, as the rear end of said receptacle, with its shorter radius arches of greater reactive tension, approaches final plug-on position embracing said tongue.

4. An electrical terminal receptacle, as covered in claim 1, further characterized by an arcuate guide nose, which is integrally formed with each front arch, the forward edges of said guide noses being spaced from the flat contact surface of the body, thus two guide noses symmetrically disposed in relation to the other portions of the body, and providing an entry guide for manipulating the front end of the receptacle onto the contact tongue, by which said front end of the terminal receptacle readily finds the extremity of said tongue, and readily noses itself into the plane of the latter, for conveniently piloted and guided quick-connect engagement therewith.

MARTIN D. BERGAN.

No references cited.